C. F. ERICKSON.
VEHICLE WHEEL.
APPLICATION FILED JULY 1, 1915.
1,194,978.
Patented Aug. 15, 1916.
2 SHEETS—SHEET 2.
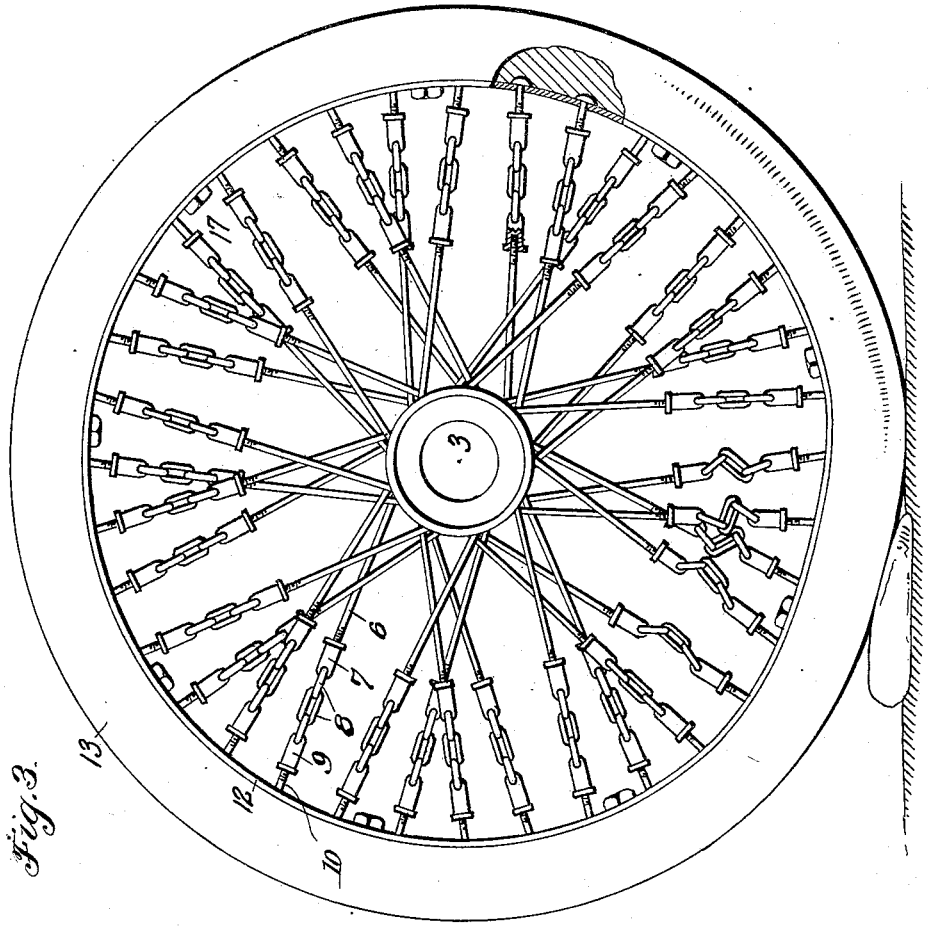
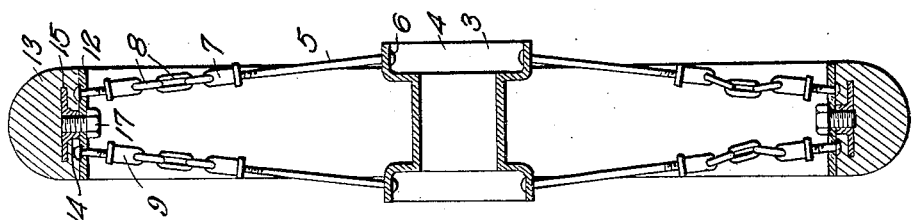
WITNESSES
INVENTOR
Charles F. Erickson
BY
ATTORNEY

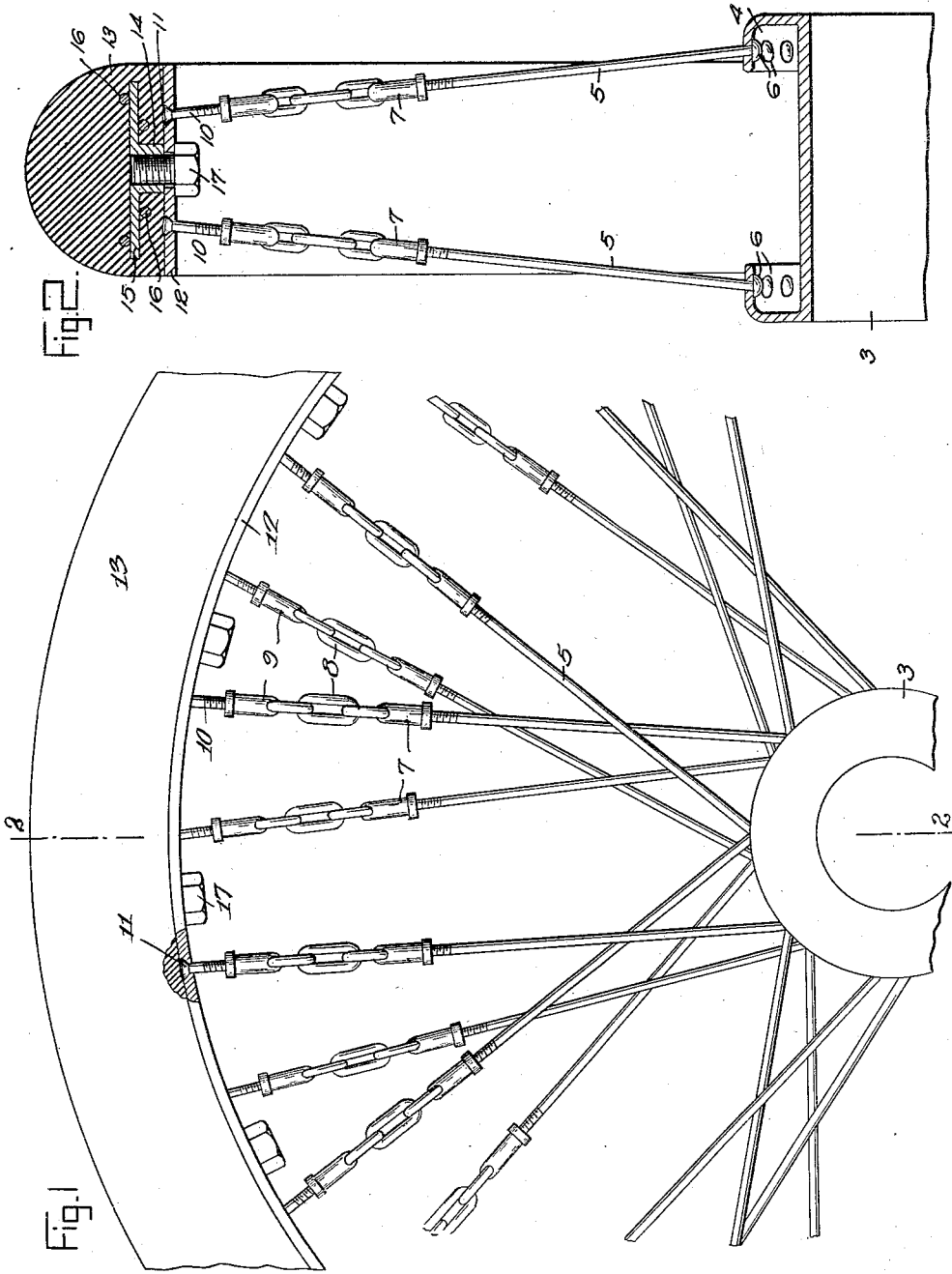

UNITED STATES PATENT OFFICE.

CHARLES F. ERICKSON, OF NEW YORK, N. Y.

VEHICLE-WHEEL.

1,194,978.  Specification of Letters Patent.  Patented Aug. 15, 1916.

Application filed July 1, 1915. Serial No. 37,480.

*To all whom it may concern:*

Be it known that I, CHARLES F. ERICKSON, a subject of the King of Sweden, and a resident of the city of New York, borough of Brooklyn, in the county of Kings and State of New York, have invented a new and Improved Vehicle-Wheel, of which the following is a full, clear, and exact description.

My invention relates to vehicle wheels, and has reference more particularly to the resilient, non-pneumatic class of wheels.

The object of the invention is to provide a simple, strong and inexpensive wheel which is characterized by a resilient rim connected to the hub by spokes having links.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in the views.

Figure 1 is an elevation of a fragment of a wheel embodying my invention; a portion of the rim is broken to show the details of construction. Fig. 2 is a section on line 2—2, Fig. 1. Fig. 3 is an elevation of the wheel illustrating a deformation caused by an obstacle; and Fig. 4 is a cross section of the wheel through the deformed part.

Referring to the drawings, 3 represents the hub, having flanges 4 provided with openings to receive wire spokes 5, the heads 6 of which abut against the corresponding flanges. The other end of each spoke is threaded to receive a socket 7 which is connected by a link 8 to a similar socket 9. Each of said second sockets engages the threaded end of a shorter spoke member 10, the head 11 of which engages a recess in the resilient rim 12 preferably shaped of a steel band, the threaded sockets engaging the spokes forming the means for varying the tension of the spokes.

It is self-evident that the spoke members 5 and 10 can be inverted, that is to say, the spoke members 5 may be secured to the rim 12, and the spoke members 10, to the flanges 4. The method of securing the spoke members to the flanges and rim may vary according to circumstances and size of wheel.

Engaging the rim 12 is a rubber shoe 13 in which are embedded a plurality of sockets 14 at suitable intervals within the inner periphery of the shoe. Each of the sockets 14 has wings or shoulders 15 forming anchors therefor within the shoe. Also embedded within the body of the shoe are annular wire members 16, preferably contacting with the shoulders of the sockets, forming reinforcements for the shoe and giving body to the same adjacent the rim. The rim 12 is provided with apertures adapted to register with the sockets, through which securing screws 17 can be brought into engagement with the sockets and secure the shoe to the rim.

The combination of the steel band forming the rim with the spokes having links, allows the rim to give when pressure is applied thereto, as shown in Figs. 3 and 4. The links in the spokes will move where the pressure is applied to the resilient rim. The deformation of the rim will be only local, as the spokes will shorten only where pressure is applied. The spokes, being substantially inelastic, cannot expand and, therefore, will prevent a buckling up of the rim in the upper part of the wheel when pressure is applied to the lower, as shown in Figs. 3 and 4.

I claim:

1. In a vehicle wheel, a hub, a steel band forming the resilient rim, spokes connecting the hub to the rim, each of said spokes comprising two solid wire sections, one secured to the hub and the other to the rim, each of said sections having a threaded end, a socket threaded on to the end of each section having an eye at its end and an open link engaging the eyes of the sockets, and a shoe engaging the rim.

2. A vehicle wheel, comprising a hub having a flange at each end, a steel band forming a resilient rim, a shoe secured on the rim, and a plurality of spokes connecting each flange of the hub with the resilient rim at each side of the center of width thereof, the spokes crossing each other and each consisting of two wire sections of unequal length and having threaded ends, a pair of threaded sockets screwing onto the spoke sections, and an open link loosely engaging and connecting the sockets.

In testimony whereof I have signed my name to this specification in the presence of two subscribing witnesses.

CHARLES F. ERICKSON.

Witnesses:
IRA TRAUTMAN,
MINNIE ZAGAT.

Copies of this patent may be obtained for five cents each, by addressing the "Commissioner of Patents Washington, D. C."